Jan. 14, 1958
R. L. HIXSON
2,819,531
DIAL INDICATOR
Filed May 25, 1953
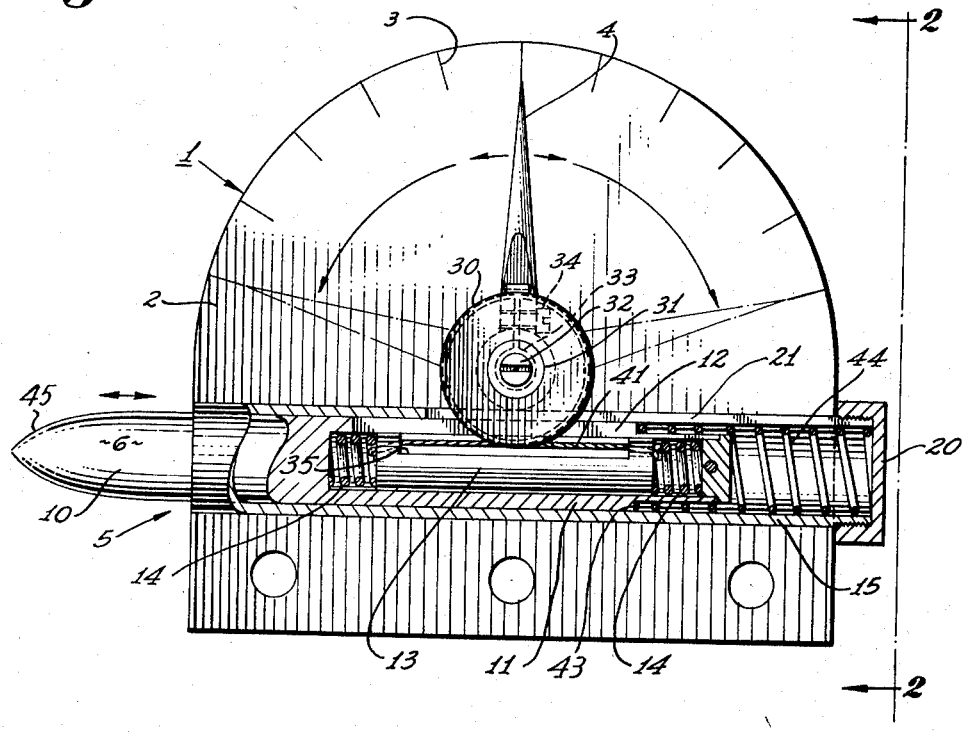
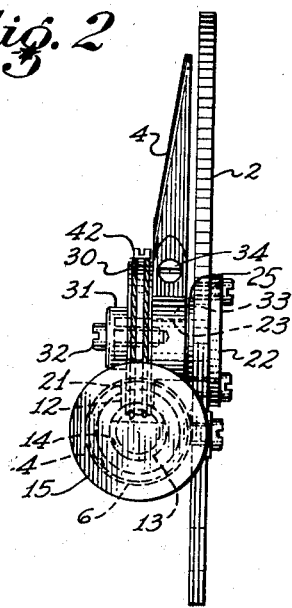
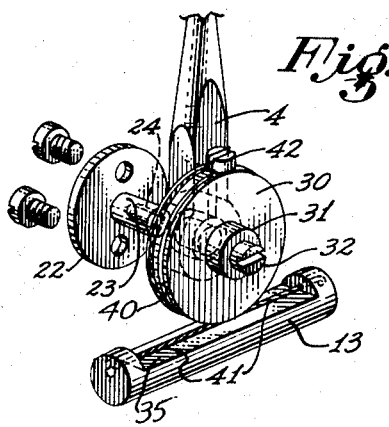
INVENTOR:
Raymond L. Hixson
By Herbert E. Metcalf
His Patent Attorneys

United States Patent Office 2,819,531
Patented Jan. 14, 1958

2,819,531

DIAL INDICATOR

Raymond L. Hixson, Manhattan Beach, Calif., assignor to Northrop Aircraft, Inc., Hawthorne, Calif., a corporation of California Application May 25, 1953, Serial No. 356,929

3 Claims. (Cl. 33—172)

My invention relates to the field of measuring devices and more particularly to dial indicators including means whereby readings on the indicator, due to momentary vibrational deflections and the like acting on the feeler member of the indicator, are minimized.

A need has arisen for measuring sideward deflections of missiles during the first few seconds of their flight. Considerable vibration is encountered during this period which greatly increases the problem of deflection measurement. During the launching of the missile it is imperative that the components of thrust imparted to it from side boosters placed thereon meet at the center of gravity of the missile to propel it along the proper trajectory. Where it is desired to know the extent of any shift in the thrust axis, i. e., the difference between intersection of the components of thrust and the center of gravity, a means for measuring such sideward deflections of the boosters must be found. Such means must be effective to minimize deflections due to vibrational excitation of the missile and respond to unilateral deflections caused by the booster, and able to provide readings which for the most part result from the latter type of deflections. If this were not possible, the camera recordation of the launching would reveal a series of oscillations without any positive indication of the extent of the actual sideward deflection or shift in the thrust axis.

It is, therefore, a principal object of my invention to provide a dial indicator responsive to unidirectional deflections while by vibrational excitation imparted to the same structure is minimized.

A further object of my invention is to provide a simple, inexpensive dial indicator effective to discriminate between vibrational forces and unidirectional forces imparted to the measuring structure.

Another object of my invention is to provide the aforementioned discriminating means by using a spring loaded cushioning mechanism.

Other objects and uses will become apparent from the subsequent disclosure.

For a complete disclosure of my invention, a detailed description of a preferred embodiment will now be given in connection with the accompanying drawings forming a part of the specification wherein:

Figure 1 is a front elevation of the dial indicator as assembled with a part in section.

Figure 2 is an end elevational view of the dial indicator looking in the direction of arrows 2—2 of Figure 1.

Figure 3 is an exploded view of the mass compliance system of the dial indicator, a part being broken to reduce the height of the figure.

Referring to the drawings, the dial indicator assembly 1 comprises a dial face 2, with dial markings 3, a dial pointer 4, and means 5 for actuating the pointer 4. A cylindrical spindle 6 is provided to function as a probing means, the forward portion 10 of said spindle 6 being solid while the rearward section 11 is hollowed out and slotted at 12 on top. Disposed within the hollow section 11 is a floating mass 13 flanked on either side by a compression spring 14. The spindle 6 is supported by and travels within a tubular member 15 releasably secured to the dial face 2, said member being enclosed at one end by a cap member 20 and is slotted at 21 to complement the spindle slot 12. An abutment member 22 having an extension member or shaft 23 integral therewith is releasably secured to the back of the dial face 2, the shaft 23 having a centrally located bore 24 therein. Placed on the shaft 23 is a metal washer 25, the dial pointer 4, and a cylindrical disk 30, and an abutment means comprising a washer 31 and a screw 32. The disk 30 has a boss 33 over which the pointer 4 is placed and secured in position by means of tightening a clamp screw 34 which effectively tightens the pointer 4 onto the boss 33. The floating mass 13 is recessed to form a groove 35 in which the disk 30 is able to roll. Disposed in a peripheral groove 40 in the disk 30 is a wire cable 41 which has its respective ends secured to either end of the floating mass 13 and is also secured to said disk 30 by a small set screw 42. Located between an annular shoulder 43, formed on the rearward section of the spindle 6, and the cap member 20 is a compression spring 44. The spring 44 bears on the shoulder 43 and cap member 20 and therefore urges the spindle 6 to the left at all times.

The operation of my invention, in light of the structural recitation, follows. The probing end 45 of the spindle 6 is positioned against the particular structure whose detection is desired. A positive unidirectional force exerted by the structure on the spindle 6 will cause the latter to travel rearwardly within the tubular member 15. Since the cable 41 is secured to the floating mass 13 which moves rearwardly with the spindle 6, the rearward movement is transmitted to the disk 30 at the point where the cable 41 is attached to the disk 30, viz, at the set screw 42. Thus, the disk 30 is caused to rotate counterclockwise when the spindle 6 is moved into the tubular member 15, and conversely when the spindle 6 moves outwardly. Movement of the disk 30 imparts a corresponding rotary movement to the pointer 4 secured to said disk 30, thus rendering a dial reading on the dial face 2. The dial markings 3 are correlated to correctly reflect the amount which the spindle 6 is moved under the impetus of the structural deflection. Where the structure is being subjected to vibrational excitation, such deflections will result in bilateral deflections of the structure. These deflections are taken up in the main by the inertia of the floating mass 13 and the tension exerted by the two tension springs 14. Before the vibrational deflection in one direction can impart a positive movement to the spindle 6, the deflection will reverse its direction and once again impart its effect to the mass 13 and springs 14 where such effect will be damped out or dissipated. Hence, even though the structure being inspected is subjected to both vibrational forces and positive unidirectional forces, the former will be discriminated against and only the latter will be measured.

The theory of the indicator as disclosed herein may be helpful to those seeking the explanation for the ability of the indicator to discriminate between unidirectional deflections and vibrationally caused deflections. Under an exciting or forcing frequency, the dial pointer will be displaced a certain amount. The magnitude of the displacement will depend upon two factors, namely, the ratio of the forcing frequency with respect to the natural frequency of the system being acted upon, and the ratio of the relative motion between the cushioning springs and the floating mass with respect to the amplitude of the forcing frequency. If the aforementioned relative motion can be opposed by a force which will offset its effect before such effect is imparted to the spindle, then the vibrational force will not displace the pointer, which is what is desired. By making them cushioning springs and the floating mass such that the mass compliance system has a rather low natural frequency, say, in the order of 15 cycles per second, any forcing frequency imparted thereto of a higher exciting frequency will result in a lesser displacement of the floating mass than occurs in the vicinity of the resonant frequency. Thus where the anticipated vibrational excitation or forcing frequency has a rather high frequency, displacement of the mass, and consequently of the pointer, is negligible.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A dial indicator for measuring deflections of a structure comprising: a dial face having calibrations thereon; a pointer mounted on said dial and correlated with respect to said calibrations to provide deflection readings when moved from an initial position; a sleeve member secured to said dial face; elongated probe means mounted in said sleeve member for longitudinal movement therein in response to deflections of said structure when said probe means is in contact with said structure; cushioning means mounted in said probe means for longitudinal movement therein and which includes a floating mass mounted between a pair of compression springs which are restrained by portions of said probe means; and linkage means connecting said mass and pointer effective to transmit movements of said mass to said pointer to provide said deflection readings.

2. A dial indicator for measuring deflections of a structure comprising: a dial face; a pointer mounted on said dial face and cooperating with calibrations on the latter to provide deflection readings when said pointer is moved from an initial position; a sleeve member having an annular cross-section secured to said dial face; elongated cylindrical probe means having a probe end and an aft end and which is mounted in said sleeve member for longitudinal movement; spring means effective to urge said probe means in one direction in said sleeve member and urged in the opposite direction in response to deflections of said structure; cushioning means mounted in said probe means for longitudinal movement therein and which includes a floating mass mounted between a pair of compression springs which are restrained by portions of said probe means; and linkage means connecting said mass and pointer effective to transmit movements of said mass to said pointer to provide said deflection readings.

3. Apparatus as set forth in claim 2, further characterized in that said cushioning means is mounted in a cavity formed in said probe means and which constitutes a bore extending lengthwise of said probe means, said floating mass is of cylindrical configuration and is mounted in said bore, and said pair of compression springs bear on respective ends of said mass and respectively on portions of the probe end and aft end portions of said probe means.

References Cited in the file of this patent

UNITED STATES PATENTS

| 1,433,076 | Green | Oct. 24, 1922 |
| 2,346,578 | Haskins | Apr. 11, 1944 |
| 2,378,201 | Dewan | June 12, 1945 |
| 2,396,383 | Moore | Mar. 12, 1946 |
| 2,438,747 | Gibbs | Mar. 30, 1948 |
| 2,533,522 | Sisson | Dec. 12, 1950 |

FOREIGN PATENTS

| 681,521 | France | May 15, 1930 |
| 971,197 | France | June 28, 1950 |